(12) United States Patent
Yukawa et al.

(10) Patent No.: US 7,238,643 B2
(45) Date of Patent: Jul. 3, 2007

(54) LAMINATED BODY FOR PRINTING WITH TEMPORARY DISPLAY LAYER AND PRINTING METHOD USING THE SAME

(75) Inventors: Shigeo Yukawa, Wakayama (JP); Jiro Sukoboshi, Kishiwada (JP); Masanobu Tanaka, Naga-gun (JP)

(73) Assignee: Kiwa Chemical Industry Co., Ltd., Wakayama-shi (JP)

( * ) Notice: Subject to any disclaimer, the term of this patent is extended or adjusted under 35 U.S.C. 154(b) by 431 days.

(21) Appl. No.: 10/400,400

(22) Filed: Mar. 28, 2003

(65) Prior Publication Data

US 2003/0165668 A1    Sep. 4, 2003

Related U.S. Application Data (63) Continuation of application No. PCT/JP02/07375, filed on Jul. 22, 2002.

(30) Foreign Application Priority Data

Jul. 30, 2001  (JP)  .............................. 2001-229084

(51) Int. Cl.
    *B41M 5/20*    (2006.01)
(52) U.S. Cl. ................. 503/227; 428/32.11; 428/32.12
(58) Field of Classification Search ............ 428/32.11, 428/32.12; 503/227
    See application file for complete search history.

(56) References Cited

U.S. PATENT DOCUMENTS

| | | | |
|---|---|---|---|
| 5,364,412 A | 11/1994 | Furukawa ........................ 8/471 |
| 5,451,560 A | 9/1995 | Akada ......................... 503/227 |
| 5,488,907 A | 2/1996 | Xu et al. ..................... 101/488 |
| 5,683,475 A | 11/1997 | Furukawa ........................ 8/471 |
| 5,789,341 A | 8/1998 | Furukawa .................... 503/227 |
| 5,830,263 A | 11/1998 | Hale et al. ................ 106/31.27 |
| 6,071,611 A * | 6/2000 | Ohta et al. ................ 428/32.11 |
| 6,103,042 A * | 8/2000 | Hatada et al. ............... 156/235 |
| 6,409,330 B1 * | 6/2002 | Nakamura et al. ........... 347/103 |
| 6,652,087 B2 * | 11/2003 | Furukawa .................... 347/101 |
| 6,750,175 B2 | 6/2004 | Furukawa .................... 503/227 |
| 2002/0149658 A1 | 10/2002 | Furukawa .................... 347/101 |

FOREIGN PATENT DOCUMENTS

| | | |
|---|---|---|
| JP | 63-78795 | 4/1988 |
| JP | 7-1683 | 1/1995 |
| JP | 7-61151 | 3/1995 |
| JP | 8-76399 | 3/1996 |
| JP | 8-258407 | 10/1996 |
| JP | 9-156212 | 6/1997 |
| JP | 9-300601 | 11/1997 |
| JP | 10-297197 | 11/1998 |
| JP | 11-84709 | 3/1999 |
| JP | 2000-211240 | 8/2000 |
| JP | 2001-334800 | 12/2001 |

OTHER PUBLICATIONS

Opposition mailed Oct. 13, 2004 by Japanese Patent Office.

* cited by examiner

*Primary Examiner*—Bruce Hess
(74) *Attorney, Agent, or Firm*—Westerman, Hattori, Daniels & Adrian, LLP.

(57) ABSTRACT

A laminated body for printing with a temporary display layer is configured so that the temporary display layer capable of being peeled, which includes at least one layer capable of printing and displaying, and a substrate layer including at least one layer are laminated. A surface side of the temporary display layer that does not contact with the substrate layer has a property of absorbing ink that contains a sublimable dye and includes a resin composition that does not generate a blocking phenomenon during a heat treatment for sublimating the sublimable dye to diffuse into the substrate layer and to dye the substrate layer. This laminated body allows the dye in the temporary display layer to sublimate by the application of heat so as to print an image in the substrate layer. By peeling the temporary display layer, original display can be presented with excellent long term durability and dimensional stability against heat.

30 Claims, 3 Drawing Sheets

LAMINATED BODY FOR PRINTING WITH TEMPORARY DISPLAY LAYER AND PRINTING METHOD USING THE SAME

This application is a continuation of international application PCT/JP02/07375 filed on Jul. 22, 2002.

TECHNICAL FIELD

The present invention relates to a laminated body for printing with a temporary display layer, and more specifically relates to a laminated body for printing with a temporary display layer that enables sublimation transfer.

BACKGROUND ART

In conventional signboards and display boards, during a period until new information to be displayed originally starts to be used, there is a case where old information has to be displayed continuously or messages saying under construction, under a refit and the like have to displayed. In such cases, conventionally, coverings are put on a newly-prepared signboard and a display board so as to keep the new information out of sight, or when a temporary message is required, the temporary message is printed on a removable type marking film, and the film is attached on a surface of a newly-prepared signboard and the like, whereby the temporary information is displayed until new information to be displayed originally starts to be used.

However, masking with the covering degrades the appearance. In addition, when temporary information is displayed using a removable type film and the like by screen printing that is a common printing method in the pertinent art, a screen needs to be prepared for each type and each specification, and therefore this method is not economical. When displaying is conducted using letters cut from a film, this work requires a great deal of time, and moreover a full color image cannot be obtained in addition that the film cost is increased.

Meanwhile, recently, a method of temporary displaying in which an ink acceptance layer is provided on a surface of the above-described removable type film, full-color printing is conducted by the ink jet method and the film is attached on a newly prepared signboard becomes common. In such a case also, the labor required for attaching the film and the like and the cost of the film and an adhesive are added, and therefore this method is not economical.

For example, JP 8(1996)-76399 A is an invention that relates to a recording sheet for an overhead projector (OHP). This publication discloses a recording sheet including a substrate on which a transparent acceptance layer is formed. By forming a transparent film on both surfaces of the substrate, after an image formed on one surface is peeled off to erase it, another image can be formed on the other surface. Thereby, an economical sheet that can be used twice for each sheet is disclosed. However, no consideration is given to this sheet for the use in the open air, and therefore this sheet does not have sufficient weather-resistant properties in the open air.

In addition, JP 9(1997)-156212 A describes that, in order to obtain a gray-scale image by altering an image density by means of a thermal head that controls the heat to be applied, double-layered ink acceptance layer is formed on a supporting member, a first image is formed in a first ink acceptance layer with an ink used for an ink-jet recording method, and the heating control is conducted by means of a thermal head so as to alter the density of the image, so that a gray-scale image is obtained in a second ink acceptance layer. Thereafter, the first ink acceptance layer is peeled off so that a favorable gray-scale image can be obtained. However, according to this method, the image formation process by the heating control using the thermal head has to be repeated a plurality of times, and therefore this work is not economical because of a great deal of time required for obtaining a color image. Additionally, the printed ink acceptance layers do not have sufficient weather-resistant properties in the open air.

Furthermore, JP 9(1997)-300601 A describes a thermal transfer sheet provided with an ink transfer layer and a recorded image holding layer that is formed so as to generate an adhesion capability at a rear face thereof by heating, and a method using the same. According to this publication, a printed image is formed by a method of transferring an adhesion layer onto a surface of a film, and its post-printing weather-resistant properties in the open air are not sufficient.

Thus, even when resins described regarding the substrate and the supporting film in these known inventions are used, the weather-resistant properties in the open air are not sufficient, and therefore it is difficult or impossible to apply these inventions to a film for the open air.

Moreover, the burden to check the finished image of advertisements, signboards, display boards and the like on which information is displayed in reality or to check the harmony with surroundings may be required. It has been demanded strongly to reduce the man-hours and the cost required for this checking process.

Films used conventionally in the open air include films containing various synthetic resins such as a vinyl chloride resin, a polyurethane resin, and a fluororesin as a main component. However, the film containing a vinyl chloride resin, a polyurethane resin and the like as a main component has a problem in that exposure for a relatively short term causes a degradation in gloss, cracks and contamination, so that a durability for a long term cannot be expected. As for the fluororesin film, there is no problem in the weather-resistance properties of the resin film itself, and therefore the film can be used for a long time. However, a manufacturing method for the same requires heating at high temperatures, which causes the sublimation of most of the ultraviolet absorber added to the resin, which leads to a situation where the ultraviolet absorber does not exist inside of the manufactured film. Therefore, although the fluororesin film keeps the weather-resistant properties for a long time without problems, a deterioration in layers under this fluororesin film, such as an adhesive, a printing ink, a surface resin in the object for adhesion and the like, due to ultraviolet rays cannot be avoided, which becomes serious problems in the market. Also, such a fluororesin film is inferior in transparency and in dispersibility of pigments to an acrylic resin film and the like, and therefore, it is difficult to manufacture a colored film having an excellent transparency. In addition, the fluororesin film exhibits non-cohesiveness due to a property to form a surface with a considerably small interaction with external substance. Consequently, when an adhesive and the like is applied to the fluororesin film to attach the film to any objects, a physical procedure such as corona discharge has to be conducted on a surface of this fluororesin film. The corona discharge treatment is a method in which a film is passed between an electrode and a roll, across which a high voltage is applied to generate the corona discharge. This method has a problem in that, for example, unless enough attention is paid to the stability of the atmosphere close to the electrode together with the selection of appropriate equipment, it is hard to obtain a stable and firm adhesion. Furthermore, since the fluororesin film is drawn in the manufacturing method, there is a problem in that the film contracts due to the heating process such as heat treatment.

Therefore, it has been demanded to develop a laminated body for printing that enables temporary display at a low cost and with a simple process, has a capability of showing an original display by simply removing the temporary display when it becomes unnecessary, and has an expectable durability for a long time in addition to an excellent dimensional stability against heat.

DISCLOSURE OF THE INVENTION

In order to deal with the above-described conventional problems, an object of the present invention is to provide a laminated body for printing with a temporary display layer, which enables temporary display at a low cost and with a simple process, has a capability of showing an original display by simply removing the temporary display, and has an expectable durability for a long time in addition to an excellent dimensional stability against heat.

More specifically, an object of the present invention is to provide a laminated body for printing with a temporary display layer, which allows a dye in the temporary display layer to sublimate by the application of heat to print an image in a substrate layer.

To fulfill the above-stated object, a laminated body for printing with a temporary display layer according to the present invention is configured so that the temporary display layer capable of being peeled, which comprises at least one layer capable of printing and displaying, and a substrate layer including at least one layer are laminated. A surface side of the temporary display layer that does not contact with the substrate layer has a property of absorbing ink that contains a sublimable dye and comprises a resin composition that does not generate a blocking phenomenon during a heat treatment for sublimating the sublimable dye to diffuse into the substrate layer and to dye the substrate layer. Printing is conducted in the temporary display layer using ink that contains a sublimable dye, followed by heat treatment so that the sublimable dye is sublimated and is diffused into the substrate layer, whereby the substrate layer can be dyed.

BEST MODE FOR CARRYING OUT THE INVENTION

The present invention provides a laminated body for printing with temporary display layer, which includes an upper layer including a peelable temporary display layer and a substrate layer with a surface layer having an excellent weather-resistant properties. Especially, such a laminated body for printing with temporary display layer gives a decorative effect to any objects through an adhesive or by means of thermal lamination and the like, and can improve the weather-resistant properties in the open air of the objects remarkably.

In addition, during a period until information to be displayed originally starts to be used, old information and temporary information, which are printed with a ink jet printer, thermal transfer printer, a laser printer and the like, can be displayed, and when the temporary display becomes unnecessary, by peeling the temporary display layer, the required new information can be presented.

Furthermore, new information that is originally required is printed in the temporary display layer using an ink containing a sublimable stain, the finished appearance is checked, and heat is applied to the temporary display layer, so that the information printed in the temporary display layer can be sublimated to dye the substrate layer. After that, by peeling the temporary display layer, a laminated body for printing that can maintain high weather-resistant properties can be provided.

In the laminated body for printing with temporary display layer of the present invention, it is preferable that a force A for peeling the peelable temporary display layer and the substrate layer is in a range from 0.008 N/10 mm to 1.18 N/10 mm, inclusive, and a breaking strength B of the temporary display layer has a relationship of A<B.

It is preferable that a surface side of the peelable temporary display layer that contacts with the substrate layer has a gloss whose 60° gloss is 30 or more.

It is preferable that glass beads are mixed in the peelable temporary display layer, where the glass beads are not exposed onto the surface side that contacts with the substrate layer.

It is preferable that assuming that a film thickness of the peelable temporary display layer is C μm and an average particle diameter of the glass beads is D μm, a relationship of $\alpha \cdot C = D$ ($0.2 \leq \alpha \leq 2$) is satisfied and a filling factor E % (volume %) of the glass beads is in a range of $1 \leq E \leq 70$.

It is preferable that the surface side of the peelable temporary display layer that contacts with the substrate layer comprises a resin with non-affinity with respect to the sublimable dye.

It is preferable that the peelable temporary display layer comprises an ink jet ink acceptance layer.

It is preferable that a porous pigment is mixed in the peelable temporary display layer so that a density of the porous pigment of the surface side that does not contact with the substrate layer equals to or more than that of the surface side that contacts with the substrate layer.

It is preferable that an alcoholic compound is mixed in the peelable temporary display layer. This is for preventing the bleeding of the dye.

It is preferable that the peelable temporary display layer comprises two or more layers. It is preferable that the content of a small molecular weight compound having a molecular weight of approximately 2,000 or less is minimized in a lower layer of the peelable temporary display layer that contacts with the substrate layer so as to be from 0 to 20 weight %.

It is preferable that a surface layer of the substrate layer comprises a fluororesin film made of a fluoroolefin copolymer that is soluble in a solvent.

It is preferable that the fluororesin film is formed by reaction of fluoroolefin copolymer that is soluble in a solvent having a reactive functional group and at least one selected from a hardening agent and a hardening catalyst that react with the reactive functional group.

It is preferable that among layers that make up the substrate layer, a layer that contacts with the fluororesin film comprises a urethane resin.

Figure 1:
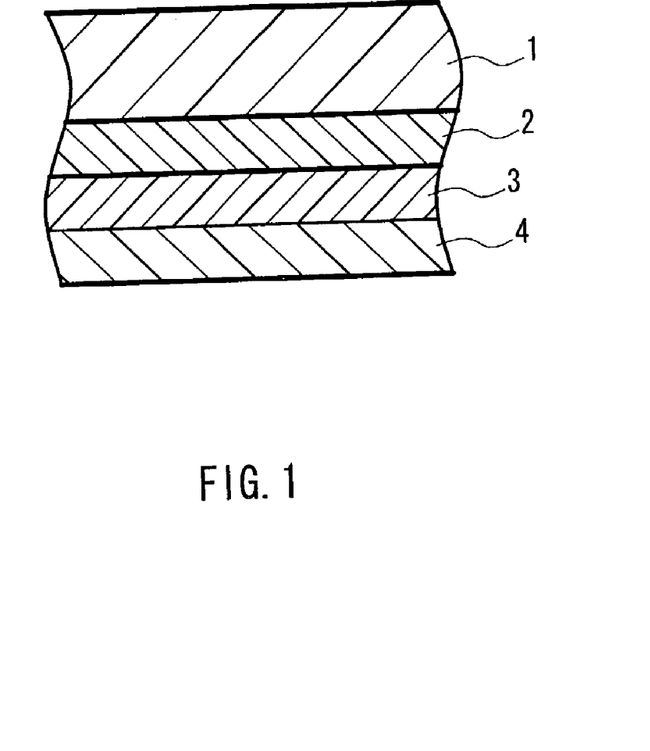
FIG. 1 schematically shows a cross-section of a laminated body for printing with a temporary display layer according to one embodiment of the present invention.

A laminated body for printing with a temporary display layer will be described below in detail, with reference to one embodiment. FIG. 1 shows a construction of the laminated body for printing with a temporary display layer according to the present invention. A releasing sheet 4 may be integrated under a substrate layer 2 via an adhesion layer 3. A film making up the temporary display layer 1 is capable of printing and displaying by means of heat transfer printing, electrostatic printing, ink jet printing and the like, and, in particular, it is preferable to use an ink jet printer as the printing means, which enables full color printing easily. For this purpose, it is preferable that the temporary display layer 1 basically includes an ink acceptance layer that can preferably absorb the ink so as to keep it therein. In addition, in order to retain the gloss of a surface of the substrate layer 2 from which the temporary display layer 1 has been peeled off, it is preferable to control a rear face side of the temporary display layer 1, i.e., the surface contacting with a surface of the substrate layer 2 to have approximately 30 or more of 60° gloss, preferably approximately 50 or more, and more preferably approximately 70 or more. In the case that the gloss of the surface side of the substrate layer 2 is approximately less than 30, the image distinctness of the surface of the substrate layer 2 from which the temporary display layer 1 has been peeled off deteriorates, which would degrade the recognizability of information to be displayed originally. In addition, it is preferable that the thickness of the temporary display layer 1 having the peelability is controlled to be approximately 1 μm to approximately 100 μm, more preferably approximately 3 μm to approximately 80 μm and the most preferably approximately 5 μm to approximately 60 μm. In the case the thickness is less than approximately 1 μm, the absorbed amount of ink becomes insufficient, and the workability for peeling would deteriorate. In the case that the thickness exceeds approximately 100 μm, when the sheet is rolled up like a roll, a difference in a radius of curvature between the sides of the temporary display layer that contacts with the substrate layer and that does not contact with the same becomes large, so that a compressive stress acts on the lower layer side, whereas a tensile stress acts on the upper layer side. Then, when the rolled sheet is rolled out again, a so-called bone-in phenomenon is likely to occur, where the temporary display layer 1 is peeled off partially to become loose like a streak. Moreover, the rigidity increases in the sheet, which would increase the cost. In addition, the rigidity of the sheet increases, and the cost for the same tends to increase. Furthermore, it is preferable to control the peelable temporary display layer 1 to have a pencil hardness of 3B or more, preferably 2B or more and much preferably B or more. In the case that the pencil hardness does not reach 3B, when the substrate sheet is rolled to be long or when the sheets are overlaid, the temporary display layer 1 might be destroyed by compression or might generate a blocking phenomenon due to the rolled pressure and the load. The pencil hardness is measured in accordance with JIS K5400 8.4.

It is preferable to control a peeling force A for the temporary display layer 1 to be in a range from approximately 0.008 N/10 mm to approximately 1.18 N/10 mm, inclusive, more preferably a range from approximately 0.012 N/10 mm to approximately 0.98 N/10 mm, inclusive, and much preferably a range from approximately 0.016 N/10 mm to 0.78 N/10 mm, inclusive, and as for a relationship with a breaking strength B, the relationship A<B is established. In the case that the peeling force A is approximately less than 0.008 N/10 mm, problems in that the temporary display layer 1 might peel off from the substrate layer 2 during a process such as printing, the temporary display layer 1 that absorbs an ink during a printing process to swell might peel off, or the like, would occur. Also, in the case that the breaking strength is not more than the peeling strength, when the temporary display layer is peeled off, the film would be broken, and therefore the peeling operation would become difficult.

Resins used for forming the above-described temporary display layer 1 include, for example, a polyurethane resin, an acrylic resin, a fluororesin, unmodified or modified polyvinyl alcohol, polyester, acrylic urethane, a vinyl chloride maleic anhydride copolymer, sodium of alkyl ester, gelatin, albumin, casein, starch, SBR latex, NBR latex, a cellulose resin, an amide resin, a melamine resin, polyacrylamide and polyvinyl pyrrolidone. These materials may be cationic modified, or hydrophilic groups may be added to these materials, and one or more types of the thus prepared materials may be used.

Moreover, silica, clay, talc, diatomaceous earth, zeolite, calcium carbonate, alumina, zinc oxide, titanium oxide and the like may be added thereto. When a porous pigment is used, it may be used by mixing with the above resin, or it may be dispersed onto a surface of the applied resin. In the case of dispersing on a surface of the resin, a surface side of the temporary display layer that does not contact with the substrate layer can be made higher in density of the porous pigment compared with the surface that contacts with the substrate layer, even in the case of a single-layered temporary display layer. A preferable usage is in a range from approximately 0.5% (by weight) to approximately 500%, inclusive, of a resin solid content, more preferably in a range from approximately 1% (by weight) to approximately 400%, inclusive, and much preferably in a range from approximately 2% to approximately 300%, inclusive. In the case of the usage less than 0.5%, the effect for improving the absorbed amount of the ink becomes insufficient, whereas in the case of the usage more than 500%, the applied film as the temporary display layer tends to be brittle and the peelability would deteriorate.

In addition, when approximately 0.5% (by weight) of the resin solid content or more of the above-described porous pigment is used, the 60° gloss of the surface side of the temporary display layer is made at 50 or less, preferably at 30 or less and more preferably at 10 or less. With this configuration, the absorptivity of the ink can be increased, and the blocking properties of the sheet can be improved. In addition, this configuration is preferable because it improves the slip of the sheet.

Moreover, if required, glass beads may be added to the above-described temporary display layer in order to prevent the blocking. As for the added glass beads, assuming that the thickness of the temporary display layer is C μm, the particle diameter of the glass beads is D μm, the glass beads used has the relationship of a formula $\alpha \cdot C = D$. Here, as for $\alpha$, to satisfy the relationship of approximately $0.2 \leq \alpha \leq$ approximately 2 is preferable, approximately $0.3 \leq \alpha \leq$ approximately 1.9 is more preferable, and approximately $0.4 \leq \alpha \leq$ approximately 1.8 is the most preferable. Then, the glass beads are used so that the filling factor E % (by volume) is preferably in a range of approximately $1 \leq E \leq$ approximately 70, more preferably in a range of approximately $2 \leq E \leq$ approximately 60 and much preferably in a range of approximately $3 \leq E \leq$ approximately 50. In the case that $\alpha$ is approximately less than 0.2, the glass beads are buried into the ink acceptance layer, which would cause the insufficient anti-blocking capability. In the case that $\alpha$ exceeds approximately 2, when the sheet is rolled up like a roll, the sheet is pressed by the glass beads, so that the shape of the glass beads would be impressed in the sheet. In the case that the filling factor is approximately less than 1%, the effect for preventing the blocking tends to be insufficient. In the case that the filling factor exceeds approximately 70%, the absorptivity of the ink tends to be insufficient.

When the temporary display layer 1 includes two layers, an ink absorption capability can be ensured by an upper layer side and peelability from the surface layer of the substrate layer 2 can be ensured by a lower layer side, in addition that the gloss of the surface layer of the substrate layer 2 can be kept and the strength to withstand a tensile stress applied during the peeling process can be added. In this case, in order to improve the ink absorption property, it is preferable to set the density of the porous pigment added in the upper layer side to be equal to or more than that in the lower layer side. In order to ensure the gloss of the rear face side of the temporary display layer 1, i.e., the side contacting with the surface side of the substrate layer 2 so as to keep the gloss of the surface of the substrate layer 2, it is preferable that the amount of the porous pigment used in the lower layer side of the temporary display layer 1 is as small as possible. Additionally, in order to ensure the strength to withstand the tensile stress applied during the process of peeling the temporary display layer 1, it is preferable that the amount of the porous pigment used in the lower layer side is set to be equal to or less than that in the upper layer side. When the temporary display layer 1 includes three or more layers, it is preferable that the added amount of the porous pigment used in the lowest layer side is set to be equal to or less than that in the upper layer side. When printing is conducted with respect to the temporary display layer 1 using an ink containing a sublimable dye, followed by heat treatment so that the sublimable dye is sublimated to diffuse into and dye the substrate layer, the temporary display layer 1 is required to have a property of diffusing and transferring the sublimable dye into the substrate layer 2 effectively, in addition to the above-mentioned properties. In order to satisfy these required properties, it is preferable to use a resin with non-affinity with respect to the sublimable dye in the temporary display layer 1. In particular, if a sufficient ink absorption capability is ensured by an upper layer side in the temporary display layer 1 and a capability of diffusing and transferring the sublimable dye is ensured by a lower layer side, then the sublimable dye can be diffused efficiently into the substrate layer 2 to dye the layer. For this purpose, it is preferable that a resin with non-affinity with respect to the sublimable dye is used both in the upper layer side and the lower layer side. However, considering a role shared with each layer, a resin having non-affinity and a low property of catching the dye can be applied only in the lower layer side as the sublimable dye. In this case, in order to effectively diffuse the sublimable dye that is absorbed in the upper layer side in the temporary display layer into the substrate layer to dye the layer by heating, the film thickness of the lower layer side including the non-affinity resin is controlled in a range from 0.5 to 50 μm, preferably in a range from 1 to 40 μm and much preferably in a range from 2 to 30 μm. The film thickness exceeding 50 μm would degrade the diffusion efficiency of the sublimable dye into the substrate layer. In the case of a film thickness of 0.5 μm or less, it would become difficult to eliminate the influence of the porous pigment added in the upper layer side so as to keep the gloss of the surface of the substrate layer at a high level. The resin with non-affinity to the sublimable dye include, for example, an olefinic resin such as polythene and polypropylene, a vinyl alcohol resin such as polyvinyl alcohol and polythene vinyl alcohol copolymer, a fluororesin such as polyvinyl fluoride, polyvinylidene fluoride, polytetrafluoroethylene, tetrafluoroethylene-hexafluoropropylene copolymer, tetrafluoroethylene-ethylene copolymer, polychlorotrifluoroethylene, a fluororesin having a solubility to solvent, a polysilicon resin, and a mixture of these resins.

Printing is conducted with respect to the temporary display layer 1 using a sublimable ink, followed by heating treatment, so that the temporary display layer 1 that contacts with the substrate layer 2 located beneath is heated. Then, the sublimable dye contained in the temporary display layer 1 is sublimated and penetrates the surface layer and the following layers of the substrate layer 2. Thus, since the thus obtained printed image is not produced simply by transferring the sublimable dye only in the surface layer, the printed image would not fade by the surface friction. In addition, an ultraviolet absorber contained in the surface layer and the following lower layers of the substrate layer 2 cuts sun's ultraviolet rays, which can eliminate the downstream operations for protecting the sublimable dye against fading by coating and attaching of a transparent resin.

A resin with thermal resistance may be used as the surface layer of the substrate layer 2 so as not to soften significantly or so as to prevent the occurrence of a tuck at 150 to 200° C. during the heat treatment. Specifically, as a material to satisfy this required property, synthetic resins such as a vinyl resin, an acrylic resin, an alkyd resin, a polyester resin, a urethane resin, an olefin resin, a silicon resin and a fluororesin is available. Among these resins, especially the use of a thermosetting resin is preferable, and a resin having non-affinity with respect to the sublimable dye and a property of facilitating penetration of the dye through a lower layer continued from the surface layer is desirable. In particular, the use of a crosslinking curable resin is preferable because this resin improves the weather-resistant properties in the open air and the peelability from the temporary display layer 1. More preferably, a synthetic resin containing as a main component a fluororesin with, in particular, excellent weather-resistant properties in the open air and with an excellent peelability from the temporary display layer 1 is used. The synthetic resin containing a fluororesin as a main component includes a fluororesin such as polytetrafluoroethylene, tetrafluoroethylene-perfluoroalkylvinylether copolymer, tetrafluoroethylene-hexafluoropropylene copolymer, tetrafluoroethylene-hexafluoropropylene-perfluoroalkylvinylether copolymer, tetrafluoroethylene-ethylene copolymer, polychloro-trifluoroethylene, chlorotrifluoroethylene-ethylene copolymer, polyvinylidene fluoride, and polyvinylfluoride. A common method to process these fluororesins is mainly to apply heat to melt a resin, process it into a desired shape, and cool it to form a product. The film manufactured by this method, however, is drawn vertically and horizontally, so that when the temperature increases to 150 to 200° C. in the thermal transfer process, the film tends to contract, which causes the film to be susceptible to defects such as misalignment of printing and unclear printing pattern. To avoid these defects, the surface layer of the substrate layer is preferably formed with a not-drawn fluororesin film manufactured using a fluororesin including a fluoroolefin copolymer that is soluble in the above-described solvents by a processing method such as a solvent flow expanding method. More preferably, the film is manufactured by reaction of a fluoroolefin copolymer that is soluble in a solvent having a reactive functional group and a hardening agent that reacts with this reactive functional group or manufactured by this reaction in combination with a hardening catalyst. Furthermore, when the film is used in a display board in the open air, the film might experience a significant change in temperature. In this case, the film contracts and a lower layer side is often attached to a metal plate, so that a difference in expansion rate from an upper layer side is generated due to heat. Then, a peeling force acts on a coating located between the fluororesin film in the surface layer and a lower layer close to the substrate due to the difference in the expansion rate, and therefore delamination becomes likely to occur. Meanwhile, while the display board is placed in the open air, pebbles, dust, etc., and various falling objects might hit the board. Impacts by them might generate a dent in the surface layer, which would cause troubles such as the degradation in the appearance of the display board. To cope with these problems, a urethane resin with an excellent elasticity preferably is used as a second layer continued from the surface layer of the substrate layer so as to respond to the peeling force with flexibility and enable self-cure against damages such as compression from the surface. Preferably, the urethane resin used here is urethane resins that are described later, and more preferably is a polyester urethane resin having a favorable dyeing property by the sublimable dye and even more preferably is a urethane resin that is obtained by the reaction of polyester polyol and polyisocyanate.

As the dye for sublimable ink used here, a dye having a property of sublimating or evaporating at the atmospheric pressure and at 70 to 260° C. is preferable. For example, dyes such as azo, anthraquinone, quinophthalone, styryl, di or triphenylmethane, oxazin, triazine, xanthene, methine, azomethine, acridine and diazine are available. Among them, 1,4-dimethylamino anthraquinone, bromide or chloride 1,5-dihydroxy-4,8-diaminoanthraquinone, 1,4-diamino-2,3-dichloroanthraquinone, 1-amino-4-hydroxyanthraquinone, 1-amino-4-hydroxy-2-(β-methoxyethoxy) anthraquinone, 1-amino-4-hydroxy-2-phenoxyanthraquinone, methyl, ethyl, propyl and butyl ester of 1,4-diaminoanthraquinone-2-carboxylic acid, 1,4-diamino-2-methoxyanthraquinone, 1-amino-4-anilinoanthraquinone, 1-amino-2-cyano-4-anilino (or cyclohexylamino) anthraquinone, 1-hydroxy-2(p-acetaminaophenylazo)-4-methylbenzene, 3-methyl-4-(nitrophenylazo) pyrazolone, 3-hydroxyquinophthalone and the like are available. As basic dyes, malachite green, methyl violet and the like are available, and the use of a dye that is modified with sodium acetate, sodium ethylate, sodium methylate and the like is preferable.

Printing processing is carried out with respect to the temporary display layer 1 with a sublimable ink using these dyes by the electrophotography method, the electrostatic recording method, the ink jet printing method, the thermal transferring method or the like, followed by heating at 150 to 200° C. As a result, the sublimable dye sublimates so that the printed image is diffused into the inside of the substrate layer 2 to dye the same. Among these methods, the printing method by the ink jet method is preferable. Note here that before starting the above-described heat treatment at 150 to 200° C., in order to prevent the printed ink from being transferred to a guide roll and the like when the guide roll touches the surface of the temporary display layer 1 on which the printing has been conducted with the ink, and in order to prevent a damage to the printed surface when the surface is rubbed by friction, the printed surface has to be dried before the heat treatment. During this pre-drying process, bleeding occurs at the edge portion of the printed image, or during the above-described heat treatment at 150 to 200° C. where the sublimable dye sublimates to diffuse into the inside of the substrate layer to dye the same, the dye bleeds from the edge portion of the image, which causes the edge of the image to be blurred and makes outline letters on a colored background dirty, thus degrading the sharpness of letters and images. Upon extensive research in order to cope with these problems, the inventors of the present invention have conceived that the above-described bleeding during the pre-drying and the heat treatment can be avoided by the temporary display layer 1 that contains alcoholic compounds. Such alcoholic compounds include, for example, polyvalence alcohols such as ethylene glycol, diethylene glycol, propylene glycol, butylene glycol, triethylene glycol, tetraethylene glycol, polyethylene glycol, polypropylene glycol, thiodiglycol and glycerin, glycol ethers such as ethylene glycol monomethyl ether, diethylene glycol monomethyl ether, diethylene glycol monoethyl ether, diethylene glycol monobutyl ether, propylene glycol monomethyl ether, and higher alcohols. Among these alcohol compounds, polyethylene glycol and polypropylene glycol are preferable and, in particular, polyethylene glycol with a molecular weight of 300 or more is more preferable, 1000 or more is much preferable, and 2,000 or more is even more preferable. When the polyethylene glycol with a molecular weight of less than 300, the polyethylene glycol is transferred to the substrate layer 2 during the heat treatment, which would cause the bleed-out of the polyethylene glycol onto the surface of the substrate layer over the course of time. The content of these alcoholic compounds is 3 to 60 weight % with respect to the temporary display layer 1, preferably is 4 to 50 weight %, and more preferably is 5 to 40 weight %. In the case of the addition less than 3 weight %, the effect for preventing the bleeding of the dye would become insufficient, whereas in the case of the addition exceeding 60 weight %, the sublimation and transfer efficiency of the dye from the temporary display layer to the substrate layer during the heat treatment would be degraded significantly.

Note here that, although the temporary display layer 1 may include a single layer or multiple layers, in the case of being configured with two or more layers, the content of a low molecular weight compound having a molecular weight of approximately 2,000 or less is minimized in a lower layer contacting with the substrate layer 2 as much as possible. The preferable content is approximately 20 weight % or less, more preferable content is approximately 15 weight % or less and even more preferable content is approximately 10 weight % or less. The above-described low molecular weight compound is an organic compound having a molecular weight of approximately 2,000 or less. In the case that content of low molecular weight compounds such as various addition agents including a plasticizer, a thermal stabilizer, etc., and an oligomer of the resin used in the temporary display layer exceeds approximately 20 weight %, the dye tends to bleed at the edge portion of the image during the heat treatment for sublimating and dyeing.

A preferable film used as the surface layer of the substrate layer 2 is a film containing as a main component fluororesin obtained by making fluoroolefins as a fluoro-monomer. Specific examples of such a fluororesin include homopolymer of fluoroolefins such as polyvinylidene fluoride, vinylidene fluoride-tetrafluoroethylene-hexafluoropropylene copolymer and a copolymer of fluoroolefins, in addition to a copolymer of each fluoroolefin and a monomer other than the fluoroolefin.

Among them, in terms of the workability of manufacturing a film, the copolymer of fluoroolefins and the copolymer of each fluoroolefin and a monomer other than the fluoroolefin are preferable especially by virtue of a good solubility in general-purpose solvents (hereinafter these are also referred to as fluoroolefin copolymer). Specific examples of fluoroolefins used when preparing such a fluoroolefin copolymer include vinyl fluoride, vinylidene fluoride, trifluoroethylene, tetrafluoroethylene, chlorotrifluoroethylene, hexafluoropropylene, (per)fluoroalkyltrifluorovinylether having a carbon number of C1 to C18. By co-polymerizing two or more types of these fluoroolefins, a copolymer including only fluoroolefins as a monomer component can be obtained. In addition, by co-polymerizing these fluoroolefins and a monomer that can be co-polymerized with these fluoroolefins, a fluoroolefin copolymer that is soluble in solvents can be prepared. Specific examples of a vinyl monomer that can be co-polymerized with these fluoroolefins include alkyls such as methyl vinyl ether, ethyl vinyl ether, n-butyl vinyl ether, cyclohexyl vinyl ether, cyclopentyl vinyl ether, carboxylic vinylesters such as cycloalkyl vinyl ethers, vinyl acetate, vinyl propionate, butyl butyrate, vinyl pivalate, vinyl versatate, vinyl benzoate, p-t-butyl vinyl benzoate, cyclohexanecarboxylic vinyl and isoprope­nyl acetate, a monomer including a hydroxyl group such as 2-hydroxyethyl vinyl ether, 3-hydroxypropyl vinyl ether, 4-hydroxybutyl vinyl ether, 2-hydroxy ethylallyl ether and 2-hydroxy ethyl (meta) acrylate, a monomer containing a carboxyl group such as acrylic acid and methacrylic acid, a monomer having an amino group such as N,N-dimethylaminoethyl (meta) acrylate and N,N-dimethylaminoethyl vinyl ether, a monomer having an epoxy group such as glycidyl vinyl ether and glycidyl (meta) acrylate, a monomer having a silyl group with hydrolyzability such as trimethoxy vinylsilane, triethoxy vinylsilane, 2-trimethoxy ethyl vinyl ether and γ-methacryloxy propyl trimethoxysilane, a vinyl monomer having a silyloxy group such as 2-trimethyl silyloxy ethyl vinyl ether and 4-trimethyl silyloxy butyl vinyl ether, a monomer having a silyloxy carbonyl group such as trimethylsilyl (meta) acrylate and vinyl-5-trimethylsilyl oxycarbonyl pentanoate, in addition to ethylene, propylene, vinyl chloride and various alkyl (meta) acrylate. Among these monomers, in terms of the co-polymerizing property and coating property, etc., the use of vinylester and vinyl ether without a functional group is preferable as an essential component. If required, the above-described monomer having a reactive functional group can be co-polymerized.

A preferable co-polymer of fluoroolefins and a monomer other than fluoroolefins that is used for implementing the present invention is obtained by co-polymerizing approximately 15 to 70 weight % of fluoroolefin, approximately 0 to 30 weight % of vinyl monomer containing a reactive functional group and approximately 5 to 85 weight % of another monomer that can be co-polymerized with them. A more preferable co-polymer is obtained by co-polymerizing approximately 20 to 65 weight % of fluoroolefin, approximately 5 to 25 weight % of vinyl monomer containing a reactive functional group and approximately 10 to 75 weight % of another monomer that can be co-polymerized with them. In the case of the usage of fluoroolefin less than approximately 15 weight %, the durability, antifouling effect and the permeability of the sublimable dye become insufficient, whereas in the case of the usage exceeding approximately 70 weight %, the solubility into general-purpose solvents would deteriorate, thus degrading the workability. As for the weight-average molecular weight of the co-polymer used, in terms of the workability and the durability of the film, a preferable range is approximately 5,000 to 400,000 and a more preferable range is approximately 7,000 to 300,000.

Specific examples of these fluoroolefin polymers and a method for preparing the same are as described in JP 53(1978)-96088 A, JP 57(1982)-34107 A, JP 59(1984)-102962 A, JP 61(1986)-113607 A, JP 61(1986)-57609 A, JP 61(1986)-141713 A, JP 62(1987)-84137 A, JP 62(1987)-185740 A, JP 64(1989)-29450 A. Also, as the method for preparing the fluoroolefin copolymer used in the present invention, methods in which a copolymer that contains as essential components fluoroolefin and carbonyl vinylester, which is prepared beforehand, is subjected to the hydrolytic degradation so as to convert it into a polymer having a hydroxyl group and in which dibaisc acid anhydride is added to a fluoroolefin copolymer having a hydroxyl group so as to convert them into a polymer having a carboxyl group can be adopted.

Among the above-described fluoroolefin copolymers, typical commercially available copolymers that contain a hydroxyl group as a reactive functional group include, for example, FLUONATE K-700, K-701, K-702, K-703 and K-704 (trade names) produced by Dainippon Ink and Chemicals, Inc., LUMIFLON LF-100, LF-200, LF-300, LF-400, LF-500 and LF-600 (trade names) produced by Asahi Glass Co., Ltd., and CEFRAL COAT A-101B, A-201TB and A-100TMB (trade names) produced by Central Glass Co., Ltd.

The preferable fluororesin film used as the surface layer of the substrate layer 2 that makes up the laminated body for printing with a temporary display layer according to the present invention can be prepared using a fluoroolefin copolymer and an acrylic polymer as described above. The acrylic polymer mentioned here is a homopolymer or a copolymer whose essential component is acrylic ester or metaacrylic ester, and those with or without a reactive functional group may be available as described above. Although various known copolymers are available as this acrylic polymer, in terms of the durability and the workability, it is preferable to use the polymer with a weight-average molecular weight of approximately 5,000 to 400,000 and more preferably approximately 7,000 to 300,000. When a fluoroolefin copolymer and an acrylic polymer are used concurrently as the resin for the surface layer as described above, the ratio by weight between the former and the latter is preferably in a range approximately 30:70 to approximately 98:2 and more preferably in a range approximately 40:60 to approximately 95:5. In the case of the usage of the acrylic polymer less than approximately 2%, the properties of the acrylic polymer to be assigned would not be exerted sufficiently, whereas in the case of the usage exceeding approximately 70 weight %, the durability, the antifouling effect and the permeability of the sublimable dye would become insufficient.

When forming the substrate layer 2 of the laminated body for printing with a temporary display layer according to the present invention, the fluoroolefin copolymer and the acrylic polymer are used in a state where they are dissolved in an organic solvent. In the case that the fluoroolefin copolymer and the acrylic polymer that is mixed with the former have a reactive functional group as described above, a material having a functional group that can react with the above-stated reactive functional group may be mixed therewith as a hardening agent. In the case of having a silyl group with hydrolyzability as the reactive functional group, a catalytic hardener made of acids, basic or various organic tin compounds may be mixed therewith. In addition, also in the case that the hardening agent is mixed as described above, a catalyst suitable for promoting the hardening reaction may be added. As the hardening agent, in the case that the reactive functional group of the fluoroolefin copolymer is a hydroxyl group or a silyloxy group, polyisocyanate, block polyisocyanate, amino resin, metalalkoxide, metal chelate compounds or the like can be used. In the case that the reactive functional group is an epoxy group, polycarboxy compounds, polysilyloxycarbonyl compounds, polyamine compounds or the like can be used. In the case that the reactive function group is a carboxyl group or a silyloxycarbonyl group, polyepoxy compounds, epoxysilane compounds, metal chelate compounds or the like can be used. In the case that the reactive functional group is an amino group, polyepoxy compounds, epoxysilane compounds or the like can be used. When an amino resin is mixed with the fluoroolefin copolymer or the mixture of a fluoroolefin copolymer and an acrylic polymer as a hardening agent, approximately 5 to 100 parts by weight of amino resin (more preferably approximately 10 to 600 parts by weight) is preferably mixed with approximately 100 parts by weight of the above-described base resin component.

In the case that a hardening agent other than the amino resin is mixed, the hardening agent is mixed so that the functional group of the hardening agent constitutes preferably approximately 0.2 to 2.5 equivalent weight and more preferably approximately 0.5 to 1.5 equivalent weight with respect to 1 equivalent weight of the reactive functional group in the fluoroolefin copolymer or the mixture of the fluoroolefin copolymer and the acrylic polymer.

A ultraviolet absorber or an antioxidant, or both of them can be added to a composition used for forming the above-described surface layer of the substrate layer. The addition of these agents further improves the long term durability. As the ultraviolet absorber, known agents can be used. Typical examples of the ultraviolet absorber include hydroxybenzophenone compounds, benzotriazole compounds, salicylate ester compounds, anilide oxalate compounds and unsaturated nitrile compounds. Typical examples of the antioxidant include hindered amine compounds, hindered phenol compounds and phosphite compounds, and the use of these agents is preferable.

As the organic solvent, conventionally known solvent can be used. Specific examples include: esters such as ethyl acetate, butyl acetate and ethylcellosolve acetate; aromatic hydrocarbons such as toluene, xylene and ethylbenzene; aliphatic or alicyclic hydrocarbons such as hexane, heptane, octane, cyclohexane and ethylcyclohexane; alcohols such as methyl alcohol, ethyl alcohol, isopropanol, n-butanol and isobutanol; and ketones solvent such as acetone, methyl ethyl ketone, methyl isobutyl ketone and cyclohexanone. Among them, when polyisocyanate compounds are used as the hardening agent, the use of the alcoholic solvent must be avoided.

As shown in FIG. 1, in the substrate layer 2 of the laminated body for printing with a temporary display layer according to the present invention, a resin film making up the lower layer continued from the surface layer preferably is made of polyurethane resin, vinyl chloride-vinyl acetate copolymer, vinyl chloride-vinyl propionate copolymer, polyvinyl butyral resin, cellulose resin, polyester resin, epoxy resin, phenoxyl resin, polyamide resin, acrylic resin, amino resin and the like. Among them, the use of the polyurethane resin is preferable. As the polyurethane resin, it is preferable to use a resin composition made of a polyurethane resin obtained from the reaction of polyol and polyisocyanate. In addition, it is more preferable to use a low molecular compound having two or more groups reacting with an isocyanate group as a chain elongation agent. As the polyol for the present invention, the use of polyester polyol and polyetherpolyol, either alone or in a combination of them is suitable. High-molecular-weight diol is preferable especially for the polyol in the present invention. As the high-molecular-weight diol, polyester diol or polyether diol, either alone or in a combination of them can be used.

The polyester diol suitable for the use, for example, includes: one or two or more types of diol such as ethylene glycol, 1,2-propylene glycol, 1,3-propylene glycol, 1,3-butylene glycol, 1,4-butylene glycol, 2,2'-dimethyl-1,3-propanediol, 1,6-hexanediol, 3,3'-dimethyl-1,5-pentanediol, 1,8-octanediol, diethylene glycol, cyclohexane-1,4-diol and cyclohexane-1,4-dimetanol; and one or two types of condensation products made of dicarboxylic acids such as succinic acid, maleic acid, adipic acid, glutaric acid, pimelic acid, suberic acid, azelaic acid, sebacic acid, phthalic acid, isophthalic acid, terephthalic acid and hexahydroisophthalic acid.

Ring opening polymers such as γ-butyrolactone and ε-caprolactone in which the above-described diol function as an initiator also are available. In addition, poly carbonic ester diol such as poly (hexamethylene carbonate) diol also is available. As the polyether diol, ethylene oxide alone or two or more types of ring opening polymers in which the diol as in the above description regarding the polyester diol functions as an initiator are available. Ring opening polymers of tetrahydrofuran also are available. Among the above-described diol, high-molecular-weight diol having a number-average molecular weight of approximately 600 to 5,000 is preferable. On the other hand, in the case of a number-average molecular weight of less than approximately 600, the coating becomes too hard. In addition, as the number of mols required for polymerizing a urethane resin increases, the amount of isocyanate increases. Accordingly, the crystallinity increases, devitrification occurs in the coating, and the solubility into a solvent decreases, thus degrading the workability in the film processing. In the case of the number-average molecular weight exceeding approximately 5,000, the strength of the coating decreases, and the processing property of the laminated film deteriorates. Among the above-described high-molecular-weight diol having the number-average molecular weight of approximately 600 to 5,000, the use of poly (alkylene carbonate) diol is preferable because of its excellent light exposure properties and antihydrolyzability.

As the low molecule compounds having two or more groups reacting with an isocyanate group, polyol and polyamine, either alone or in a combination of two or more types of them is available. In particular, preferable low molecular weight compounds in the chain elongation agent include diol and diamine. Preferable diols include, for example, ethylene glycol, 1,4-butylene glycol, 1,6-hexanediol, neopentylglycol, diethylene glycol and cyclohexane-1,4-dimethanol. Preferable diamines include ethylenediamine, 1,2-propanediamine, 1,3-propanediamine, hexamethylenediamine, hydrazine, piperazine, N,N'-diamino piperazine, 2-methyl piperazine, 4,4'-diamino dicyclo hexyl methane, isophoronediamine and the like. These compounds can be used alone or in a combination of two or more types. Among these chain elongation agents, low molecular weight diamine having a number-average molecular weight of approximately 200 or less is preferable. In the case of the number-average molecular weight exceeding approximately 200, the cohesive power of the urethane resin decreases, and therefore stretch property as a feature of the urethane resin could not be exerted.

As polyisocyanate, for example, aromatic diisocyanates such as tolylene diisocyanate, xylylene diisocyanate, tetramethyl xylylene diisocyanate and diphenylmethane diisocyanate; aliphatic or alicyclic diisocyanate such as hexamethylene diisocyanate, lysine diisocyanate, cyclohexane diisocyanate, isophorone diisocyanate and dicyclohexyl methane diisocyanate; triphenyl methane triisocyanate; polyphenyl polymethylene polyisocyanate; polyisocyanate including a carbodiimide group; polyisocyanate including an allophanate group; polyisocyanate including an isocyanurate group; and the like are preferable. Among of these polyisocyanates, the aliphatic or alicyclic diisocyanate is preferable because of its excellent weather-resistant properties and the like. The above-described polyurethane resin can be obtained by conducting solution polymerization in an organic solvent.

As the organic solvent, dimethylformamide, cellosolve acetate, ethyl acetate, methyl ethyl ketone, toluene, tetrahydrofuran, isopropanol, cyclohexanone and the like are available. The solution reaction is conducted normally in the organic solvent, if required in the presence of a catalyst, at a reaction temperature of approximately 50 to 120° C. for 5 to 10 hours. Although the order of the reaction of the high-molecular-weight diol, isocyanate and the chain elongation agent is not especially limited, normally a method in which the high-molecular-weight diol and the diisocyanate are reacted in the condition of excessive amount of isocyanate group, so that a urethane polymer whose terminal group is an isocyanate group is obtained, and then this polymer is reacted with the chain elongation agent can be adopted. Although the reaction ratio between diol and diisocyanate, and the chain elongation agent as needed is not especially limited, normally assuming that the total active hydrogen atomic weight of the diol and the chain elongation agent is set at 1.00 equivalent weight, the weight ratio to be obtained is approximately 0.95 to 1.10 equivalent weight.

When manufacturing the polyurethane resin, a catalyst and a stabilizer may be used if required. As the catalyst, for example, nitrogen-containing compounds such as triethylamine, triethylenediamine and morpholine; metal salt such as potassium acetate, zinc stearate and stannous 2-ethylhexoic acid; and organometallie compounds such as dibutyltin dilaurate are available. As the stabilizer, a stabilizer against ultraviolet rays such as substituted benzotriazole, a stabilizer against thermal oxidation such as a phenol derivative and the like can be added. These catalyst and stabilizer can be added at any stage during a manufacturing process of the polyurethane resin.

A ultraviolet absorber and an antioxidant, or both of them can be added to the polyurethane resin that can be used in the present invention so as to further improve the long term durability. As such a ultraviolet absorber, those conventionally known can be used. Typical examples of the ultraviolet absorber include hydroxybenzophenone compounds, benzotriazole compounds, salicylate ester compounds, anilide oxalate compounds and unsaturated nitrile compounds.

Typical examples of the antioxidant include hindered amine compounds, hindered phenol compounds and phosphite compounds. Additionally, to the polyurethane resin that can be used in the present invention, an anti-hydrolytic degradation agent, pigment, dye, thickening agent, antifoaming agent, surface active agent, antistatic agent, flame retardant agent, deodorizer, dispersing agent, tackifier, filler, crosslinking agent and the like can be added, if required. Also, in the present invention, other resins that are normally used can be used together with the polyurethane resin, if required. Such resins include, for example, polyurethane resin, vinyl chloride-vinyl acetate copolymer, vinyl chloride-vinyl propionate copolymer, polyvinyl butyral resin, cellulose resin, polyester resin, epoxy resin, phenoxyl resin, polyamide resin, acrylic resin and amino resin. The number-average molecular weight of the polyurethane resin is normally in a range of approximately 5,000 to 100,000, and preferably in a range of approximately 2,000 to 50,000.

The substrate layer 2 shown in FIG. 1 is manufactured as follows: In the first step, coating for the surface layer of the substrate layer is applied on a support film such as a polyethylene terephthalate film and a casting sheet so that the dried film thickness becomes approximately 0.5 to 300 μm, preferably approximately 2 to 200 μm and more preferably approximately 3 to 100 μm. After that, the thus applied coating is subject to a second step in a wet state. Alternatively, the coating is dried at room temperatures or by heating. Next, in the second step, a coating for a lower layer continued from the surface layer is applied so that the dried film thickness becomes approximately 1 to 500 μm and preferably approximately 2 to 400 μm, followed by drying at room temperatures or by heating. As a result of these first and second steps, the substrate layer is prepared. Thereafter, the support film is peeled off, so that the substrate layer according to the present invention is manufactured. Note here that the substrate layer can be manufactured by applying the coating for the lower layer in the first step and by applying the coating for the surface layer in the second step. In this case, the support film may be left without peeling off so as to be incorporated into the substrate layer. The drying conditions after applying the coatings in the first and the second steps are determined appropriately depending on the types of a base resin used as the coating material, the types of the reactive functional group in the base resin, the types of the hardening agent and the types of the solvent. The coating in each step may be applied by means of a spray, or a normally used coater such as a knife coater, a comma coater, a roll coater, a reverse roll coater and a flow coater.

When a clear coating that does not contain a pigment is used as the coating used for forming each layer in the substrate layer 2 in the laminated body for printing with a temporary display layer of the present invention, a colorless laminated rein film can be obtained. Alternatively, when a color coating that contains a pigment is used as the coating for forming the surface layer and the lower layer continued from there, a colored substrate layer can be obtained. As the pigment used for obtaining the colored coating, organic pigments such as copper phthalocyanine blue, copper phthalocyanine green, quinacridone red and hansa yellow; inorganic pigments such as ferric oxide red, ferric oxide yellow, titanium white and cobalt blue are suitable.

As for the substrate layer in the laminated body for printing with a temporary display layer according to the present invention, which is obtained through the above-described steps, after the urethane resin film as the lower layer is formed as stated above, a further layer may be laminated on this urethane resin film. Alternatively, an adhesion layer may be formed on the urethane resin film, and then, if required, a peeling sheet may be attached to this adhesion layer so as to complete the substrate layer.

In the following step, the temporary display layer is laminated on the substrate layer at the surface layer side thereof, so as to complete the laminated body for printing with a temporary display layer of the present invention. In this step, the temporary display layer is manufactured by applying a resin for the temporary display layer by means of the above-described coaters so that the dried film thickness becomes approximately 1 μm to approximately 100 μm, preferably approximately 3 μm to approximately 80 μm, and more preferably approximately 5 μm to approximately 60 μm. Furthermore, if required, the temporary display layer can be manufactured as a laminated film that includes two or more layers. In such a case, the laminated film can be manufactured by laminating each layer from lower to upper one by one.

EXAMPLES

The following describes the present invention in more detail, with reference to examples. In the following examples, the term "parts" represents parts by weight and the term "%" represents weight %.

Example 1

Figure 2:
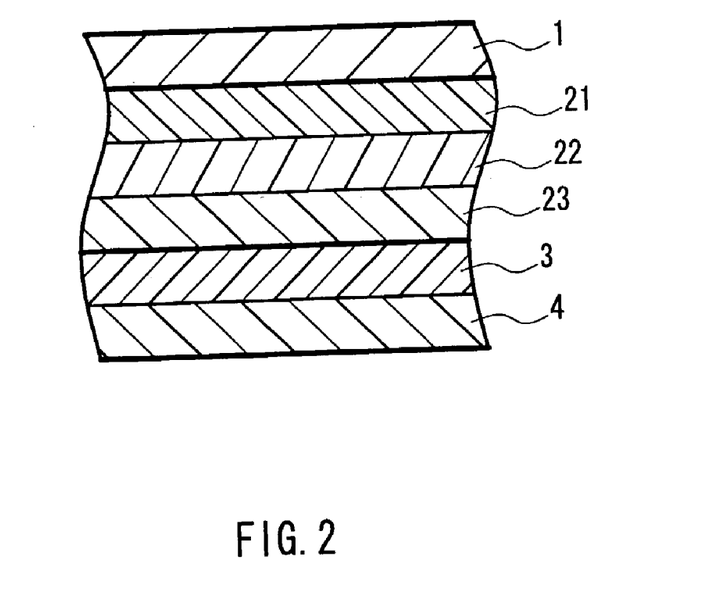
FIG. 2 schematically shows a cross-section of a laminated body for printing with a temporary display layer in Example 1 of the present invention, and Comparative Examples 2, 4 and 5.

On a polyester support film both surfaces of whom were treated to have adhesion, a polycarbonate non-yellowed type urethane resin NY-331 (produced by Dainippon Ink and Chemicals, Inc., nonvolatile content: approximately 25%, solvent: DMF, 100% modulus: approximately 55 kg) was applied so that the dried film thickness would become approximately 30 μm, followed by drying by heating at approximately 140° C. for approximately 10 minutes so as to form a second layer of the substrate layer. After that, a fluororesin coating having the following composition was applied on a surface of the second layer so that the dried film thickness would become approximately 20 μm, followed by drying by heating at approximately 140° C. for approximately 10 minutes so as to form a surface layer of the substrate layer.
(1) FLUONATE K-703 (trade name, produced by Dainippon Ink and Chemicals, Inc.,): 100 parts
(2) BURNOCK DN-950 (trade name, produced by Dainippon Ink and Chemicals, Inc.,): 25 parts
(3) Ultraviolet absorber TINUVIN 900 (trade name, produced by Ciba-Geigy): 1 part
(4) Ultraviolet absorber TINUVIN 292 (trade name, produced by Ciba-Geigy): 1 part On the rear face of the support film of the thus obtained laminated resin film, as shown in FIG. 2, a mixture solution of approximately 100 parts of acrylic adhesive FINETAC SPS-1016 (trade name, produced by Dainippon Ink and Chemicals, Inc.,) and approximately 2 parts of crosslinking agent FINETAC TA-101-K (trade name, produced by Dainippon Ink and Chemicals, Inc.,) was applied and dried so as to form an adhesion layer 3 of approximately 35 μm in thickness. Then, a silicon coated polyester film 4 is attached onto the surface to which the adhesive layer has been applied so as to manufacture the substrate layer.

On the thus manufactured substrate layer, a mixture solution having the following composition was applied so that the dried film thickness would become approximately 20 μm, where PATELACOL K-510P (trade name, produced by Dainippon Ink and Chemicals, Inc., solid content: approximately 15.5%), including aqueous-based polyurethane resin and epichlorohydrin polyamide resin and the like, was used as an aqueous-based resin composition. Then, drying was conducted at approximately 120° C. for approximately 5 minutes to manufacture the temporary display layer.
(1) PATELACOL K-51OP: 100 parts
(2) Glass beads produced by Union Glass Co., (center particle diameter: 13 μm): 3 parts (volume % constituting in the temporary display layer: approximately 5.2%)

An image was printed in the temporary display layer in the thus manufactured laminated body for printing with the temporary display layer by a piezo-type printer, which was a kind of ink jet method printers (by Mutoh Industries Ltd. RJ-6000). An ink for sublimable ink jet produced by Kiwa chemical Ind. Co., Ltd. (a set of six colors including cyan, magenta, yellow, black, light cyan and light magenta) was used in this step. The thus manufactured laminated film with the image was subjected to heat treatment according to the following two methods:
(A) Heat treatment was conducted for approximately 7 minutes using a hot-air drier (by Yamato Scientific Co. Ltd., Fine Oven DF62) set at approximately 170° C., whereby the sublimable dye was sublimated, so that the image was transferred and printed into the substrate layer side. After that, the temporary display layer was peeled off.
(B) Thermocompression treatment was conducted using a heat vacuum applicator (by HUNT EUROPE, VacuSeal 4468) at the degree of vacuum of 30 mmHg, at the setting temperature of approximately 170° C. and for approximately 7 minutes. In this step, after the thermocompressin treatment was conducted while a protective sheet was laid on the surface of the temporary display layer, the temporary display layer was peeled off in the same way as in the method (A).

Figure 3:
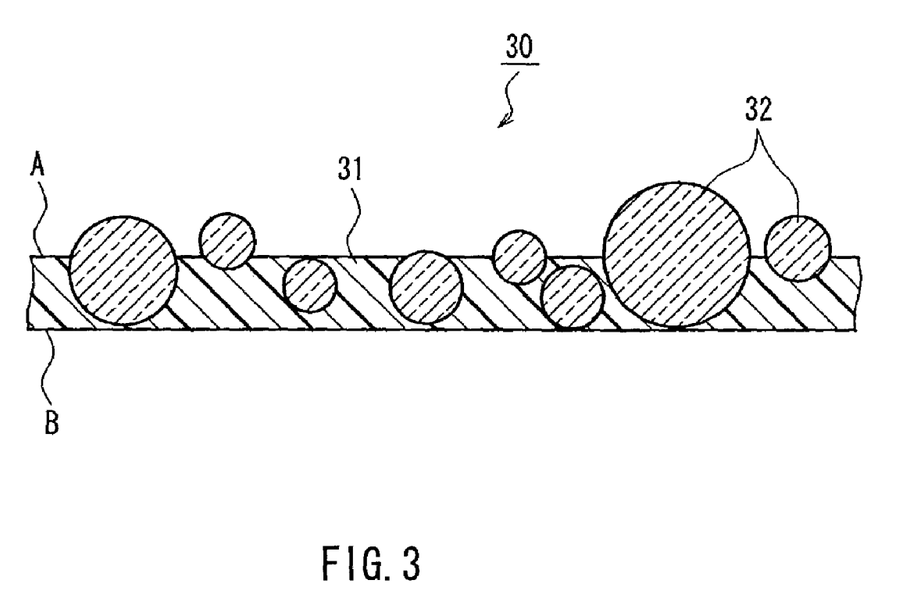
FIG. 3 schematically shows a cross-section of a portion of the temporary display layer in Example 1 of the present invention.

FIG. 2 schematically shows a cross-section of the laminated body for printing with a temporary display layer according to Example 1, obtained as described above. In FIG. 2, the temporary display layer 1 is a single layer, and the substrate layer 2 includes a surface layer 21, a second layer 22 and a third layer 23, under which a releasing sheet 4 is laminated via an adhesion layer 3. FIG. 3 is a partial view of the temporary display layer 1. In FIG. 3, the temporary display layer 30 is configured so that glass beads 32 are mixed in a resin layer 31, where the glass beads 32 are exposed onto the surface A side that does not contact with the substrate layer, but are not exposed onto the surface B side that contacts with the substrate layer.

Example 2

Except that the composition and the construction of the aqueous-based resin used in the temporary display layer were changed as follows, the construction, dimensions, and the manufacturing method and the like were the same as in Example 1.

On the substrate layer, PATELACOL IJ-70 (trade name, produced by Dainippon Ink and Chemicals, Inc., solid content: approximately 15.0%) was applied as an aqueous-based resin composition so that the dried film thickness would become approximately 10 μm, followed by drying by heating. In the following step, on the dried film, an aqueous-based resin composition with the following composition, including the above PATELACOL IJ-70 and PATELACOL IJ-150 (trade name, produced by Dainippon Ink and Chemicals, Inc., solid content: approximately 21.0%, the content of porous pigment in the solid content: approximately 70.0%), was applied so that the dried film thickness would become approximately 10 μm as above, followed by drying by heating.

(1) PATELACOL IJ-70:70 parts
(2) PATELACOL IJ-150:30 parts (the content of the porous pigment in the solid content in the above mixed composition: approximately 25%)

An image was printed in the temporary display layer in the thus manufactured laminated body for printing with the temporary display layer according to the same method as in Example 1. After that, heat was applied to transfer the image according to the methods (A) and (B) described in Example 1.

Figure 4:
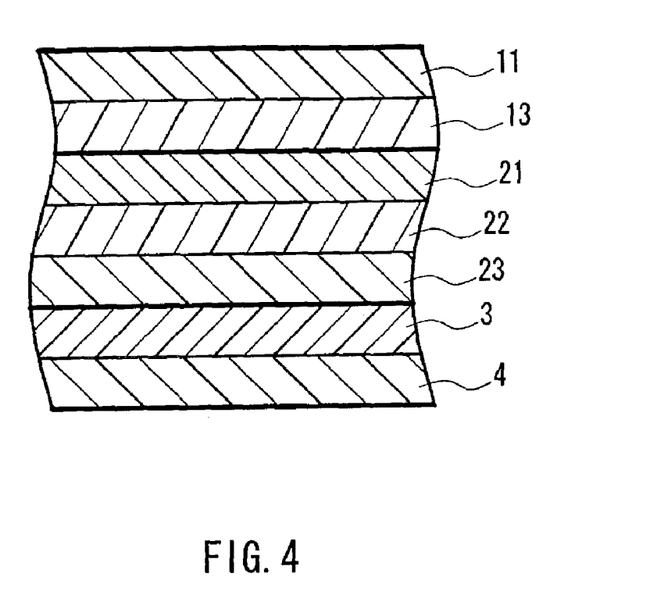
FIG. 4 schematically shows a cross-section of a laminated body for printing with a temporary display layer in Examples 2 to 7 of the present invention and Comparative Example 3.

FIG. 4 schematically shows a cross-section of the laminated body for printing with a temporary display layer according to Example 2, obtained as described above. In FIG. 4, the temporary display layer includes an upper layer 11 and a lower layer 13, and the substrate layer includes a surface layer 21, a second layer 22 and a third layer 23, under which a releasing sheet 4 is laminated via an adhesion layer 3.

Example 3

Except that the composition and the construction of the aqueous-based resin used in the temporary display layer were changed as follows, the construction, dimensions, and the manufacturing method were the same as in Example 1.

On the substrate layer, FLUONATE FEM 600 (trade name, produced by Dainippon Ink and Chemicals, Inc., solid content: approximately 45.0%) was applied so that the dried film thickness would become approximately 15 μm, followed by drying by heating. In the following step, on the dried film, MZ-100 (trade name, produced by Takamatsu Oil & Fat Co., Ltd., solid content: approximately 15%, the content of porous pigment in the solid content: approximately 56%) was applied so that the dried film thickness would become approximately 30 μm, followed by drying by heating.

An image was printed in the temporary display layer in the thus manufactured laminated body for printing with the temporary display layer according to the same method as in Example 1. After that, heat was applied to transfer the image according to the methods (A) and (3) described in Example 1.

Example 4

Except that a mixture solution of a resin composition for the surface layer 21 in the substrate layer was changed as follows, the construction, dimensions and the manufacturing method were the same as in Example 3. To be more specific, an example of the resin composition for the surface layer 21 was approximately 100 parts of a solution of tetrafluoroethylene/vinyl pivalate/ethyl vinyl ether/trimethoxy silyl ethyl vinyl ether copolymer (=40/25/15/20 (weight ratio)) having a weight-average molecular weight of approximately 30,000, where the solvent was a mixture solution of toluene/n-butanol (=70/30 (weight ratio), non-volatile content: approximately 50%), approximately 0.5 part of dibutyltin diacetate and approximately 1 part of SEESORB 102 (manufactured by Shiraishi Calcium Kaisha Ltd.).

An image was printed in the temporary display layer in the thus manufactured laminated body for printing with the temporary display layer according to the same method as in Example 1. After that, heat was applied to transfer the image according to the methods (A) and (B) described in Example 1.

Example 5

Except that a mixture solution of a resin composition for the surface layer 21 in the substrate layer was changed as follows, the construction, dimensions and the manufacturing method were the same as in Example 3. To be more specific, an example of the resin composition for the surface layer 21 was approximately 100 parts of FLUONATE K-700, approximately 30 parts of a solution of isobutyl methacrylate/n-butylacrylate/β-hydroxyethyl methacrylate copolymer (=65/20/15 (weight ratio)) having a weight-average molecular weight of 20,000, where the solvent was a mixture solution of toluene/butyl acetate (=70/30 (weight ratio), non-volatile content: approximately 50%), approximately 26.4 parts of BURNOCK DN-980 (trade name, produced by Dainippon Ink and Chemicals, Inc., polyisocyanate resin, non-volatile component: approximately 75%, and the content of isocyanate: approximately 15.0%), approximately 1 part of TINUVIN 900 and approximately 1 part of TINUVIN 292.

An image was printed in the temporary display layer in the thus manufactured laminated body for printing with the temporary display layer according to the same method as in Example 1. After that, heat was applied to transfer the image according to the methods (A) and (B) described in Example 1.

Example 6

Except that a resin composition for the second layer 22 in the substrate layer was changed as follows, the construction, dimensions and the manufacturing method were the same as in Example 3. To be more specific, an example of the resin composition for the second layer 22 was approximately 100 parts of BURNOCK D6-439 (alkyd resin produced by Dainippon Ink and Chemicals, Inc., solid hydroxyl value: 140, non-volatile content: approximately 80%) and approximately 82 parts of BURNOCK DN-980 as a hardening agent (polyisocyanate produced by Dainippon Ink and Chemicals, Inc., non-volatile content: approximately 75%).

An image was printed in the temporary display layer in the thus manufactured laminated body for printing with the temporary display layer according to the same method as in Example 1. After that, heat was applied to transfer the image according to the methods (A) and (B) described in Example 1. In this way, by the use of a two-part hardening type urethane resin using a polyol component and polyisocyanate as the second layer of the substrate layer, the three-dimensional cured coating obtained after drying by heating had a much richer elasticity than an uncured urethane resin, so that a self-cure property against damages such as compression from the surface in the open air use was enhanced markedly. In addition, the molecular weight could be increased to infinity, and the low molecular compounds that exist freely decreased, whereby the retention capability of the obtained image was improved. Furthermore, unreacted polyisocyanate that partially remained in the second layer after drying by heating reacted with functional groups in a fluororesin in the following step where the fluororesin coating for the substrate layer was applied and dried by heating. Therefore, the curing reaction occurred also at the interface between the surface layer and the second layer of the substrate layer, whereby the interlayer strength was enhanced and the durability in the open air use further was improved.

Example 7

Except that an aqueous-based resin composition for the upper layer in the temporary display layer was changed as follows, the construction, dimensions and the manufacturing method were the same as in Example 3. That is, an example of the resin composition for the upper layer in the temporary display layer was approximately 100 parts of MZ-100 (trade name, produced by Takamatsu Oil & Fat Co., Ltd., solid content: approximately 15%, the content of porous pigment in the solid content: approximately 56%) and approximately 15 parts of polyethylene glycol as a 50% aqueous solution having a molecular weight of approximately 3,000.

An image was printed in the temporary display layer in the thus manufactured laminated body for printing with the temporary display layer according to the same method as in Example 1. After that, heat was applied to transfer the image according to the methods (A) and (B) described in Example 1. As a result, bleeding of the ink did not occur at the edge portions of the printed image during a pre-drying before heating, and the image obtained after heating was very sharp and the bleeding phenomenon of the dye was not found.

Example 8

According to the same method as in Example 1, old information was printed in the temporary display layers in the laminated bodies for printing with a temporary display layer manufactured in Examples 2 to 5 using a pigment type ink for ink jet produced by SEIKO EPSON Corporation. After that, these laminated bodies were each attached to a surface of a display board on which new information to be displayed originally was displayed so as to display temporary information before the display board should start to display the new information, where the laminated bodies had not been subjected to heat treatment before the attachment. After the period for the temporary display had passed, the temporary display layers were peeled off, so that the information to be displayed originally was presented so that the display whose surface was protected with a transparent resin film with excellent weather-resistant properties was obtained.

Comparative Example 1

Except that the composition and the construction of the aqueous-based resin used in the temporary display layer were changed as follows, the construction, dimensions, and the manufacturing method were the same as in Example 1.

On the substrate layer, PATELACOL IJ-150 (trade name, produced by Dainippon Ink and Chemicals, Inc., solid content: approximately 21.0%, content of the porous pigment in the solid content: approximately 70.0%) was applied so that the dried film thickness would become 20 μm, followed by drying by heating at approximately 120° C. for approximately 5 minutes.

An image was printed in the temporary display layer in the thus manufactured laminated body for printing with the temporary display layer according to the same method as in Example 1. After that, heat was applied to transfer the image according to the methods (A) and (B) described in Example 1.

Comparative Example 2

Except that the composition and the construction of the aqueous-based resin used in the temporary display layer were changed as follows, the construction, dimensions, and the manufacturing method were the same as in Comparative Example 1.
(1) PATELACOL K-510P: 50 parts
(2) PATELACOL IJ-150: 50 parts
  (the content of the porous pigment in the solid content in the above mixed composition: approximately 40%)

An image was printed in the temporary display layer in the thus manufactured laminated body for printing with the temporary display layer according to the same method as in Example 1. After that, heat was applied to transfer the image according to the methods (A) and (B) described in Example 1.

Comparative Example 3

On a polyester support film whose both surface were treated to have adhesion, a polyurethane resin solution BURNOCK L7-920 (trade name, produced by Dainippon Ink and Chemicals, Inc., nonvolatile content: 25±1%, solvent: toluene, sec-butanol) was applied so that the dried film thickness would become approximately 30 μm, followed by drying by heating at approximately 140° C. for approximately 10 minutes so as to form a second layer of the substrate layer. After that, a vinyl chloride coating having the following composition was applied on the second layer so that the dried film thickness would become approximately 20 μm, followed by drying by heating at approximately 140° C. for approximately 10 minutes so as to form a surface layer of the substrate layer.
(1) Vinyl chloride resin: 100 parts
(2) Ethylene/vinylester resin: 25 parts
(3) Polyester plasticizer: 10 parts Note here that NIKAVINYL SG-1100N (trade name, produced by Nippon Carbide Industries Co., Inc.) and Elvaloy (trade name, produced by Du Pont-Mitsui Polychemical Co., Ltd.) respectively were used as the above vinyl chloride resin and ethylene/vinylester resin. As the polyester plasticizer, a material having a number-average molecular weight (Mn) of approximately 3,000 obtained by synthesizing mixed dihydric alcohol containing propylene glycol, butanediol and hexanediol and adipic acid was used.

After that, the substrate layer was manufactured in the same method as in Example 1. On the thus obtained substrate layer, a temporary display layer was manufactured in the same method as in Example 3.

An image was printed in the temporary display layer in the thus manufactured laminated body for printing with the temporary display layer according to the same method as in Example 1. After that, heat was applied to transfer the image according to the methods (A) and (B) described in Example 1.

Comparative Example 4

Except that PATELACOL K-510P (trade name, produced by Dainippon Ink and Chemicals, Inc., solid content: approximately 15.5%) was used as the aqueous-based resin used in the temporary display layer, the construction, dimensions, and the manufacturing method were the same as in Comparative Example 1.

An image was printed in the temporary display layer in the thus manufactured laminated body for printing with the temporary display layer according to the same method as in Example 1. After that, heat was applied to transfer the image according to the methods (A) and (B) described in Example 1.

Comparative Example 5

Except that PATELACOL IJ-50 (trade name, produced by Dainippon Ink and Chemicals, Inc., solid content: approximately 15.0%) was used as the aqueous-based resin used in the temporary display layer, the construction, dimensions, and the manufacturing method were the same as in Comparative Example 1.

An image was printed in the temporary display layer in the thus manufactured laminated body for printing with the temporary display layer according to the same method as in Example 1. After that, heat was applied to transfer the image according to the methods (A) and (B) described in Example 1.

The following Tables 1 to 4 summarize the results of estimation of the above-stated Examples and Comparative Examples.

TABLE 1

|  | Exa. 1 | Exa. 2 | Exa. 3 | Exa. 4 | Exa. 5 |
| --- | --- | --- | --- | --- | --- |
| Peeling property of temporary display layer *1 | ○ | ○ | ○ | ○ | ○ |
| Peeling property of temporary display layer *2 | 0.09 | 0.11 | 0.03 | 0.03 | 0.04 |
| Gloss of surface side of temporary display layer *3 | 23 | 5 | 2 | 2 | 2 |
| Gloss of rear face side of temporary display layer *3 | 80 | 85 | 86 | 84 | 85 |
| Breaking strength of temporary display layer *4 | 1.5 | 2.5 | 2.7 | 2.7 | 2.7 |
| Drying property of ink *5 | ○~Δ | ○ | ○ | ○ | ○ |
| Peeling property between temporary display layer and protective sheet *6 | Δ | ○ | ○ | ○ | ○ |
| Distinctness of transferred image, heat treatment method (A) *7 | ○ | Δ | ○ | ○ | ○ |
| Distinctness of transferred image, heat treatment method (B) *8 | Δ | Δ | ○ | ○ | ○ |

TABLE 2

|  | Comp. Exa. 1 | Comp. Exa. 2 | Comp. Exa. 3 | Comp. Exa. 4 | Comp. Exa. 5 |
| --- | --- | --- | --- | --- | --- |
| Peeling property of temporary display layer *1 | X | Δ | ○ | ○ | ○ |
| Peeling property of temporary display layer *2 | failure in peeling | 0.02 | 0.29 | 0.10 | 0.08 |
| Gloss of surface side of temporary display layer *3 | 3 | 4 | 2 | 95 | 96 |
| Gloss of rear face side of temporary display layer *3 | — | 5 | 81 | 117 | 117 |
| Breaking strength of temporary display layer *4 | unmeasurable | 1.6 | 2.7 | 4.39 | 6.1 |
| Drying property of ink *5 | ○ | ○ | ○ | X | X |
| Peeling property between temporary display layer and protective sheet *6 | ○ | ○ | ○ | X | X |
| Distinctness of transferred image, heat treatment method (A) *7 | X | X | ○ | ○ | ○ |
| Distinctness of transferred image, heat treatment method (B) *8 | X | X | ○ | Δ | Δ |

TABLE 3

|  |  |  | Example 3 | | | | Comparative Example 3 | | | |
|---|---|---|---|---|---|---|---|---|---|---|
|  |  |  | cyan | magenta | yellow | black | cyan | magenta | yellow | black |
| Accelerated | before | Y | 8.32 | 10.13 | 65.97 | 0.74 | 8.83 | 10.81 | 68.61 | 0.74 |
| weather- | test | x | 0.1382 | 0.4845 | 0.4310 | 0.2346 | 0.1421 | 0.5013 | 0.4340 | 0.2481 |
| proofness |  | y | 0.1409 | 0.2256 | 0.4953 | 0.2846 | 0.1347 | 0.2358 | 0.4924 | 0.2782 |
| test | after | ΔE | 3.45 | 4.81 | 5.19 | 2.90 | 19.35 | 11.34 | 16.06 | 11.57 |
|  | test | appearance | OK | OK | OK | OK | *) | *) | *) | *) |

TABLE 4

|  |  |  | Example 3 | | | | Comparative Example 3 | | | |
|---|---|---|---|---|---|---|---|---|---|---|
|  |  |  | cyan | magenta | yellow | black | cyan | magenta | yellow | black |
| Atmospheric | before | Y | 9.21 | 9.23 | 65.79 | 0.76 | 8.79 | 10.74 | 75.64 | 0.78 |
| exposure | test | x | 0.1352 | 0.5238 | 0.4316 | 0.2343 | 0.1383 | 0.5359 | 0.4410 | 0.2428 |
| test *10 |  | y | 0.1350 | 0.2429 | 0.4869 | 0.2508 | 0.1284 | 0.2526 | 0.4861 | 0.2717 |
|  | after | ΔE | 5.87 | 9.81 | 3.21 | 7.86 | 40.20 | 22.89 | 17.96 | 21.75 |
|  | test | appearance | OK | OK | OK | OK | *) | *) | *) | *) |

*) Bleeding occurred on the periphery of the image.

(Remarks)
1: Peeling by hands ○ (smoothly peeled)>Δ>X (failure in peeling because temporary layer was broken)
2: JIS Z 0237 90° peeling method N/10 mm
3: JIS Z 8741 60° specular gloss
4: JIS Z 0237 complying with the tensile strength and the extension specified by the same N/10 mm
5: Color chart of high definition color digital standard image complying with JIS X 9204 :2000 was printed at 720 dpi by means of RJ-6000 by Mutoh Industries Ltd. using an ink for ink jet produced by Kiwa chemical Ind. Co., Ltd. After 10 minutes had passed from the printing, fine paper was laid on the printed surface, which was sandwiched between aluminum boards and to which a load at 50 g/cm$^2$ was applied for one minute. Then, the presence or not of the ink transferred onto the fine paper was determined.
○: ink was not transferred.
Δ: ink was transferred partially.
X: ink was transferred entirely.
6: ○ (smoothly peeled)>Δ>X (failure in peeling because the protective sheet attached to the temporary display layer)
7: ○ (90 or more of 60° specular gloss and transferred printed density was high)>Δ (90 or more of 60° specular gloss and transferred printed density was middle, or less than 90 and 70 or more of 60° specular gloss high and transferred printed density was large)>X (90 or more of 60° specular gloss and transferred printed density was low, less than 90 and 70 or more of 60° specular gloss high and transferred printed density was middle or less, or less than 70 of 60° specular gloss), Heat treatment method was in accordance with Example 1.
8: ○ (90 or more of 60° specular gloss and transferred printed density was high)>Δ (90 or more of 60° specular gloss and transferred printed density was middle, or less than 90 and 70 or more of 60° specular gloss high and transferred printed density was large)>X (90 or more of 60° specular gloss and transferred printed density was low, or less than 70 of 60° specular gloss), Heat treatment method was in accordance with Example 1.
9: Complying with conditions of the sunshine carbon type accelerated weather-proofness test specified by JIS Z 9117. The testing time was 1,000 hours, and the color difference ΔE was measured by the photoelectric tristimulus colorimetry specified by JIS Z 8722 and was determined by the color-difference formula specified by "JIS Z8730 color difference representing method 6".
10: 45° facing to the south, atmospheric exposure test (testing location: Wakayama prefecture, Japan), the testing time was one year.

As shown in the above Tables 1 to 4, in the case of the temporary display layer including a single layer, as the content of the porous pigment increased, the absorptivity of the ink and the peeling property of the protective sheet were enhanced as in Comparative Examples 1 to 2. However, the breaking strength was decreased and the peeling property was unfavorable. In addition, since the gloss after peeling was degraded, the image distinctness of the transferred image also was unfavorable. In the case of Comparative Examples 4 to 5 where the porous pigment was not contained, problems occurred as to the drying property of the ink and the peeling property of the temporary display layer from the protective sheet, and the blocking property was unfavorable. According to Example 1 where the glass beads were used instead of the porous pigment, the above-stated drawbacks could be improved considerably. On the other hand, in the heat treatment method (B), the distinctness of the image was a little decreased, which resulted from the decrease in gloss of the surface layer of the substrate layer because the glass beads were pressed against the surface layer due to the pressure applied during the heat treatment. On the other hand, a favorable result could be obtained in the non-contact heat treatment method (A).

In the case of the temporary display layer including two layers, as in Examples 2 to 5, the lower layer of the temporary display layer could enhance the breaking strength, improve the peeling property and increase the gloss to a high level. In addition, since a sufficient amount of the porous pigment could be contained in the upper layer, favorable results could be obtained also as to the drying property of the ink and the peeling property of the protective sheet. In addition, since the resin with a higher non-affinity with respect to the sublimable dye was used in the lower layer in Example 3 to 5, the permeability of the sublimable dye could be increased. Therefore, the density of the image that was printed in the second layer of the substrate layer became high and the distinctness of the image also was favorable. In Comparative Example 3, although the temporary display layer was the same as in Example 3, the durability in the weather-proofness test was not enough because vinyl chloride resin was used as the surface layer of the substrate layer, thus the color of the image was changed or faded considerably and the image bled and blurred on the periphery. On the other hand, in Example 3, since the solvent-soluble type fluororesin having non-affinity to the sublimable dye was used in the surface layer of the substrate layer, a sufficient amount of ultraviolet absorber could be dispersed and added therein, so that the coated film had a favorable permeability for the sublimable dye, and the cutting ratio of ultraviolet rays was enough. Therefore, the changing and fading of the color of the image that was printed in the second layer could be avoided in the weather-proofness test, and the bleeding on the periphery of the image was not found.

As stated above, the laminated body for printing with a temporary display layer of the present invention can realize temporary display at a low cost and with a simply process. In addition, by simply removing the temporary display layer when it becomes unnecessary, original display can be presented. Furthermore, a laminated body for printing with a temporary display layer with an expectable durability for a long time in addition to an excellent dimensional stability against heat can be realized.

In addition, after a sublimable dye is printed in the temporary display layer, heat treatment is conducted so that the sublimable dye is diffused into the substrate layer to dye the layer, and then the temporary display layer is peeled off. Thereby, a resin film with the image printed therein having high weather-resistance properties can be obtained.

Figure 5:
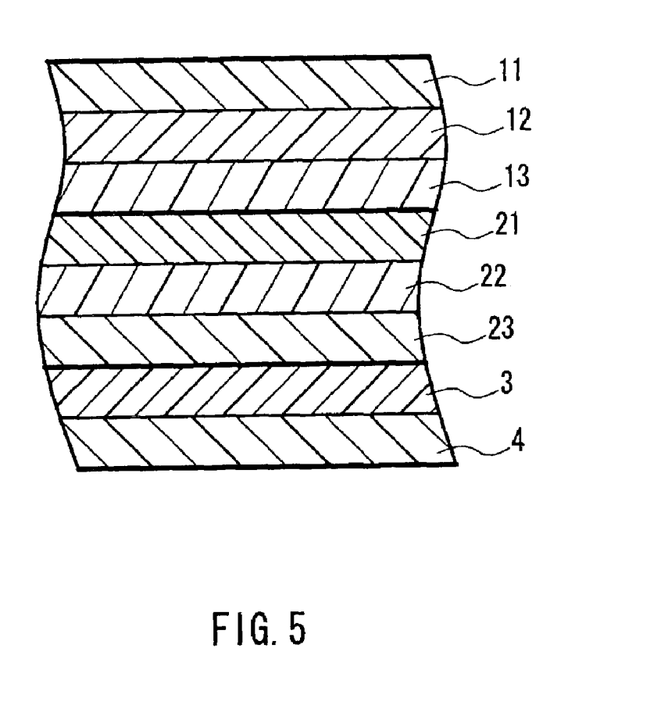
FIG. 5 schematically shows a cross-section of a laminated body for printing with a temporary display layer according to another embodiment of the present invention.

Note here that in the present invention, as shown in FIG. 5, the temporary display layer can be formed with a lamination of an upper layer or a top layer 11, a middle layer 12 and a lower layer or a bottom layer 13.

INDUSTRIAL APPLICABILITY

As described above, according to the present invention, a laminated body for printing with a temporary display layer that enables temporary display at a low cost and with a simple process, has a capability of showing an original display by simply removing the temporary display layer, and has an expectable durability for a long time in addition to an excellent dimensional stability against heat can be provided. In addition, a laminated body for printing with a temporary display layer, which allows a dye in the temporary display layer to sublimate by the application of heat so as to print an image in the substrate layer, can be provided.

The invention claimed is:

1. A printing method using a laminated body for printing, said laminated body comprising a temporary display layer, in which the temporary display layer capable of being peeled, which comprises at least one layer capable of printing and displaying, and a substrate layer including at least one layer are laminated, wherein a surface side of the temporary display layer that does not contact with the substrate layer has a property of absorbing ink that contains a sublimable dye and comprises a resin composition that does not generate a blocking phenomenon during a heat treatment for sublimating the sublimable dye to diffuse into the substrate layer and to dye the substrate layer, and a porous pigment is mixed in the peelable temporary display layer so that a density of the porous pigment of the surface side that does not contact with the substrate layer equals to or is more than that of the surface side that contacts with the substrate layer, and a printing process is conducted in the temporary display layer using ink that contains a sublimable dye, followed by heat treatment so that the sublimable dye is sublimated and is diffused into the substrate layer to dye the substrate layer.

2. The printing method according to claim 1, wherein the printing process is by an ink jet method.

3. The printing method according to claim 1, wherein a temperature of the heat treatment is in a range from 150to 200° C.

4. The printing method according to claim 1, wherein the printed ink is dried after the printing process and before the heat treatment.

5. The printing method according to claim 1, wherein a force A for peeling the peelable temporary display layer and the substrate layer is in a range from 0.008 N/10 mm to 1.18 N/10 mm, inclusive, and a breaking strength B of the temporary display layer has a relationship of A<B.

6. The printing method according to claim 1, wherein a surface side of the peelable temporary display layer that contacts with the substrate layer has a gloss whose 60° gloss is 30 or more.

7. The printing method according to claim 1, wherein glass beads are mixed in the peelable temporary display layer, where the glass beads are not exposed onto the surface side that contacts with the substrate layer.

8. The printing method according to claim 7, wherein assuming that a film thickness of the peelable temporary display layer is C μm and an average particle diameter of the glass beads is D μm, a relationship of $\alpha \cdot C = D$ ($0.2 \leq \alpha \leq 2$) is satisfied and a filling factor E % (volume %) of the glass beads is in a range of $1 \leq E \leq 70$.

9. The printing method according to claim 1, wherein the surface side of the peelable temporary display layer that contacts with the substrate layer comprises a resin with non-affinity with respect to the sublimable dye.

10. The printing method according to claim 1, wherein an alcoholic compound is mixed in the peelable temporary display layer.

11. The printing method according to claim 1, wherein the peelable temporary display layer comprises two or more layers.

12. The printing method according to claim 11, wherein from 0 to 20 weight % of a small molecular weight compound is contained in a lower layer of the peelable temporary display layer that contacts with the substrate layer, where a molecular weight of the compound is approximately 2,000 or less.

13. The printing method according to claim 1, wherein a surface layer of the substrate layer comprises a fluororesin film made of a fluoroolefin copolymer that is soluble in a solvent.

14. The printing method according to claim 13, wherein the fluororesin film is formed by reaction of a fluoroolefin copolymer that is soluble in a solvent having a reactive functional group and at least one selected from a hardening agent and a hardening catalyst that react with the reactive functional group.

15. The printing method according to claim 13, wherein among layers that make up the substrate layer, a layer that contacts with the fluororesin film comprises a urethane resin.

16. A printing method using a laminated body for printing, said laminated body comprising a temporary display layer, in which the temporary display layer capable of being peeled, which comprises at least one layer capable of printing and displaying, and a substrate layer including at least one layer capable of being dyed by a sublimable dye are laminated, wherein a surface side of the temporary display layer that does not contact with the substrate layer has a property of absorbing ink that contains a sublimable dye and comprises a resin composition that does not generate a blocking phenomenon during a heat treatment for sublimating the sublimable dye to diffuse into the substrate layer and to dye the substrate layer, and a porous pigment is mixed in the peelable temporary display layer so that a density of the porous pigment of the surface side that does not contact with the substrate layer eciuals to or is more than that of the surface side that contacts with the substrate layer, and a printing process is conducted in the temporary display layer using ink that contains a sublimable dye.

17. A printing method using a laminated body for printing, said laminated body comprising a temporary display layer, in which the temporary display layer capable of being peeled, which comprises at least one layer capable of printing and displaying, and a substrate layer including at least one layer are laminated, wherein a surface side of the temporary display layer that does not contact with the substrate layer has a property of absorbing ink that contains a sublimable dye, said temporary display layer comprising a resin composition that does not generate a blocking phenomenon during a heat treatment for sublimating the sublimable dye to diffuse into the substrate layer and to dye the substrate layer, and a porous pigment is mixed in the peelable temporary display layer so that a density of the porous pigment of the surface side that does not contact with the substrate layer equals to or is more than that of the surface side that contacts with the substrate layer, printing is conducted with respect to the temporary display layer using ink that contains a sublimable dye, the surface side of the temporary display layer that does not contact with the substrate layer comprises a layer that includes the ink containing the sublimable dye, and a heat treatment is conducted so that the sublimable dye is sublimated and is diffused into the substrate layer to dye the substrate layer.

18. A laminated body for printing, said laminated body comprising a temporary display layer, in which the temporary display layer capable of being peeled, which comprises at least one layer capable of printing and displaying, and a substrate layer including at least one layer capable of being dyed by a sublimable dye are laminated, wherein a surface side of the temporary display layer that does not contact with the substrate layer has a property of absorbing ink that contains a sublimable dye and comprises a resin composition that does not generate a blocking phenomenon during a heat treatment for sublimating the sublimable dye to diffuse into the substrate layer and to dye the substrate layer, and a porous pigment is mixed in the peelable temporary display layer so that a density of the porous pigment of the surface side that does not contact with the substrate layer equals to or is more than that of the surface side that contacts with the substrate layer, and printing is conducted in the temporary display layer using ink that contains a sublimable dye, followed by heat treatment so that the sublimable dye is sublimated and is diffused into the substrate layer, whereby the substrate layer can be dyed.

19. The laminated body according to claim 18, wherein a force A for peeling the peelable temporary display layer and the substrate layer is in a range from 0.008 N/10 mm to 1.18 N/10 mm, inclusive, and a breaking strength B of the temporary display layer has a relationship of A<B.

20. The laminated body according to claim 18, wherein a surface side of the peelable temporary display layer that contacts with the substrate layer has a gloss whose 60° gloss is 30 or more.

21. The laminated body according to claim 18, wherein glass beads are mixed in the peelable temporary display layer, where the glass beads are not exposed onto the surface side that contacts with the substrate layer.

22. The laminated body according to claim 21, wherein assuming that a film thickness of the peelable temporary display layer is C μm and an average particle diameter of the glass beads is D μm, a relationship of $\alpha \cdot C = D$ ($0.2 \leq \alpha \leq 2$) is satisfied and a filling factor E % (volume %) of the glass beads is in a range of $1 \leq B \leq 70$.

23. The laminated body according to claim 18, wherein the surface side of the peelable temporary display layer that contacts with the substrate layer comprises a resin with non-affinity with respect to the sublimable dye.

24. The laminated body according to claim 18, wherein the peelable temporary display layer comprises an ink jet ink acceptance layer.

25. The laminated body according to claim 18, wherein an alcoholic compound is mixed in the peelable temporary display layer.

26. The laminated body according to claim 18, wherein the peelable temporary display layer comprises two or more layers.

27. The laminated body according to claim 26, wherein from 0 to 20 weight % of a small molecular weight compound is contained in a lower layer of the peelable temporary display layer that contacts with the substrate layer, where a molecular weight of the compound is approximately 2,000 or less.

28. The laminated body according to claim 18, wherein a surface layer of the substrate layer comprises a fluororesin film made of a fluoroolefin copolymer that is soluble in a solvent.

29. The laminated body according to claim 28, wherein the fluororesin film is formed by reaction of a fluoroolefin copolymer that is soluble in a solvent having a reactive functional group and at least one selected from a hardening agent and a hardening catalyst that react with the reactive functional group.

30. The laminated body according to claim 28, wherein among layers that make up the substrate layer, a layer that contacts with the fluororesin film comprises a urethane resin.

* * * * *

UNITED STATES PATENT AND TRADEMARK OFFICE
CERTIFICATE OF CORRECTION

PATENT NO. : 7,238,643 B2 Page 1 of 1
APPLICATION NO. : 10/400400
DATED : July 3, 2007
INVENTOR(S) : Shigeo Yukawa et al.

It is certified that error appears in the above-identified patent and that said Letters Patent is hereby corrected as shown below:

In Column 19;
On line 45, change "... the methods (A) and (3) ..." to be -- ... the method (A) and (B) ... --

In Column 28;
On line 13, change "150to" to be --150 to --

In Column 29;
On line 16, change "eciuals" to be -- equals --

In Column 30;
On line 26, change "B" to be -- E --

Signed and Sealed this

Thirteenth Day of November, 2007

JON W. DUDAS
*Director of the United States Patent and Trademark Office*